Patented Dec. 20, 1938

2,140,819

UNITED STATES PATENT OFFICE 2,140,819

COMPOSITION HEEL

Harold F. Stose, Portsmouth, Ohio, assignor to Vulcan Corporation, Portsmouth, Ohio No Drawing. Application July 1, 1936, Serial No. 88,405

6 Claims. (Cl. 106—3)

My invention relates to a novel composition of a nature to be molded into articles of any desired shape or form, and to a method for producing such composition. More particularly, my invention relates to a composition which is usable for making objects normally made of wood, and which composition has all of the desirable characteristics of wood, such as ability to receive and hold nails, screws or other fastening means, and the ability to be molded in the absence of heat.

It is well known that fillers are used to regulate the specific gravity of the product, and to give it various desired characteristics. However, cold molding compositions which have the requisite moldability, texture, flow and finish, where a finely divided filler is used, have heretofore required a relatively large percentage of binder. With lesser percentages of binder, the properties of the molding composition and the final article have been impaired. For example, where a small percentage of binder was used, the product would crack badly when nailed, and lacked water resistance. Where a large percentage of binder was used, the lack of water resistance was overcome, but the product then possessed more of the properties of the binder than of the filler. As a specific instance, 20% or less of binder is considered relatively small, while 40% or more is considered relatively large.

The composition herein disclosed is particularly suited to the production of articles such as shoe heels, shoe trees, knobs, buttons and the like, where there is required a thoroughly homogenous, fine-grained and good-appearing product which is tough and strong even in thin sections and at sharp edges and points. Hereinafter, the description will refer to the composition as applied to the manufacture of heels for women's shoes, which are articles requiring a molding composition answering particularly rigorous specifications of strength, nailability and appearance in the finished product. However, the invention is not limited to use in the manufacture of any one article, as will be readily understood.

In its broadest sense, the process of this invention consists in mixing together a finely divided filler and a cold-molding binder, both elements being in such proportion that articles shaped from the mixture will have the characteristics of the filler and, at the same time will answer all specifications as to strength, nailability, appearance, etc.

One object of my invention is to provide a cold-molding composition and a method for preparing the same in which the proportion of binder is such as to result in a finished product which fulfills the requisite specifications and will, at the same time, have the characteristics of the filler.

Another object of my invention is to provide a cold-molding composition and a method for preparing the same which will be thoroughly homogeneous, and which will result in a product which is tough and strong even at thin edges and points, and which will answer rigorous specifications of strength, nailability, appearance, etc.

Various other objects and advantageous features will be had from the following description:

Hereinafter, one specific illustration of ingredients which have been found to be satisfactory will be given, and a method will be described which has also been found satisfactory in the preparation of a cold-molding composition with those ingredients. However, it is to be understood that various equivalent ingredients, substances, methods and steps may be used, where found to be desirable, or suitable without departing from the spirit and scope of this invention.

An illustrative example of the ingredients going to make up the formula are as follows, all quantities being given by weight:

| | Grams |
|---|---|
| Glue | 485 |
| Water | 350 |
| Sulphonated castor oil | 45 |
| Oxalic acid | 26 |
| Paraformaldehyde | 42 |
| Wood sawdust | 1300 |
| Total | 2248 |

It is understood that any desired amount of the composition may be had by a proportionate increase or decrease in the amounts of the various ingredients. The glue used is a protein containing material of animal, vegetable or mixed origin. An essential characteristic is that it can be rendered relatively insoluble or water resistant, as for example, with formaldehyde or paraformaldehyde. The method by which the above ingredients may be made into the composition will now be described.

The first step in the process consists in placing the 485 grams of glue in 350 grams of cold water and allowing it to stand until the glue has absorbed the water. Then, the glue and water are brought to a temperature of approximately 140° F. to completely liquefy the glue and produce a homogeneous mixture of the glue and water.

As a plasticizer, 45 grams of sulphonated castor oil is added to the solution of glue and water, the purpose of this ingredient being to soften and toughen the bonding agent. Good results have been obtained by the use of this plasticizer, the oil also acting as a lubricant to reduce sticking of the final molding mixture in the mold. However, any suitable plasticizer may be used, and such plasticizer may be added to the cold water before it receives the glue, at any time during the mixing of the glue and water, or may be added after the glue and water have been mixed, as desired.

After the glue and water have been brought to the solution state as hereinbefore described, a liquefying agent and a tanning and waterproofing agent are added thereto. 26 grams of oxalic acid is added to the mix as a liquefying agent or, in other words, to retard the jelling of the glue and thereby increase the working life of the molding composition. 42 grams of paraformaldehyde is added as the tanning or waterproofing agent. The paraformaldehyde on heating or more slowly at room temperature releases formaldehyde which reacts with the glue and renders it insoluble.

Such paraformaldehyde is added to the glue mix while the mix is at a temperature of 140° F. or lower and while stirring the mix. In no case should the glue mix be above a temperature of 140° F. when the paraformaldehyde is added because too high a temperature results in a rapid decomposition of the paraformaldehyde to yield gaseous formaldehyde which reacts with the glue and renders the molding composition useless, as such. Therefore, the paraformaldehyde is preferably added and stirred into the mix after the mix is removed from the heat and just prior to the time the glue mix is combined with the filler, which latter step serves to cool the entire glue mix reasonably rapidly.

In accordance with the formula herein disclosed, 1300 grams of finely divided sawdust constitutes the filler. Sawdust of any suitable grade may be used. For example, in manufacturing heels for women's shoes, it is necessary that the finished product be tough, strong and, at the same time, smooth enough to emulate a solid wooden heel when lacquered. Good results have been obtained by employing a sawdust made up of a predetermined amount which will pass through a 20 mesh screen, but will not pass through a 100 mesh screen, in combination with a predetermined amount which will pass through a 100 mesh screen. One combination of grades used in the 1300 grams set out in the formula, may be, for instance, 1100 grams of sawdust which will pass through a 20 mesh screen, but will not pass through a 100 mesh screen and 200 grams of sawdust of a fineness to pass through a 100 mesh screen. The coarser sawdust lends to the toughness of the finished article while the finer sawdust lends to the smoothness thereof. The term sawdust as used herein in the specification and in the claims is intended to include all wood particles which are produced by sawing or any other wood-working operation.

After preparing the glue mix as hereinbefore described, such mix is combined with the sawdust by a thorough mixing process which may extend over any suitable period of time, say, for example, 30 minutes or more in a mechanical mixer. After such thorough mixing of the glue mix and the sawdust the resulting composition may be cold molded into any shape desired by suitable pressure, following which the articles may be subjected to heat to decompose the formaldehyde and set the glue and drive off some of the water, or may be set aside for the slower decomposition of formaldehyde and evaporation of water, which takes place at room temperature. In some instances, it may be found desirable to both air dry and heat the articles.

The following is a tabulation of the approximate percentages of the ingredients:

| | Percent |
|---|---|
| Glue | 21.57 |
| Water | 15.56 |
| Sulphonated castor oil | 2.04 |
| Oxalic acid | 1.15 |
| Paraformaldehyde | 1.86 |
| Sawdust | 57.82 |

It will be noted that the amount of water used in the formula is substantially less than the amount of glue. This is an important feature of the process for the reason that the glue is in a more viscous form whereby it will not be readily absorbed by the wood sawdust, but will coat and stick to the outer surfaces of the particles when properly mixed with the sawdust. Thus, the amount of adhesive necessary to bind the sawdust together into a unitary mass is substantially reduced while, at the same time, an absorptive filler is used, and the finished articles have the characteristics of the filler rather than of the adhesive.

The actual ratio of glue and water will vary with the grade of glue used, and also with other conditions, but the best results have been obtained when the ratio is such that the mixture is a heavy, viscous mass at 140° F. Such a mixture, as aforesaid, will tend to coat the surface of the sawdust without excessive penetration.

I claim:

1. The method of forming an artificial wood composition which comprises mixing glue, water, sulphonated castor oil, oxalic acid and paraformaldehyde together to form a viscous mixture and then combining said viscous mixture with finely divided sawdust.

2. The method of forming an artificial wood composition in the following proportions which comprises swelling 485 grams of glue in 350 grams of cold water containing 45 grams of sulphonated castor oil, heating the mixture to approximately 140° F., adding thereto 26 grams of oxalic acid and 42 grams of paraformaldehyde and thoroughly mixing the result of the above steps with 1300 grams of finely divided sawdust.

3. An artificial wood composition comprising by weight approximately 57% of sawdust, 21% of glue, and approximately 15% of water, with relatively small portions of a soluble oil plasticizing agent, an acidic liquefying agent having the property of retarding the jelling of the glue and a waterproofing agent.

4. The method of forming an artificial wood composition which comprises swelling approximately 21% by weight of glue in 15% of cold water containing approximately 2% by weight of a plasticizer, heating the solution to approximately 140° F., adding thereto approximately 1% by weight of an acidic liquefier having the property of retarding the jelling of the glue and approximately 1% by weight of a waterproofing agent, such waterproofing agent being of a nature to become rapidly active under the influence of heat and cooling the solution to retard the action of the waterproofing agent and thoroughly mixing the solution with approximately 57% by weight of sawdust in a mechanical mixer for at least fifteen minutes.

5. The method of forming an artificial wood composition including a sawdust filler, which comprises forming a solution of glue, water, sulphonated castor oil, an acidic liquefier having the property of retarding the jelling of the glue, and paraformaldehyde, said solution having a viscosity sufficiently high to prevent its absorption by the sawdust particles, and mixing said solution with said sawdust until the particles are coated therewith.

6. The method of forming an artificial wood composition, including by weight, approximately 57% of sawdust, 21% of glue and 15% of water, together with small quantities of sulphonated castor oil, an acidic liquefier having the properties of retarding the jelling of the glue, and paraformaldehyde, comprising first making a solution of the glue, water, sulphonated castor oil, acidic liquefier and paraformaldehyde, said solution having a viscosity sufficiently high to prevent absorption of the solution by the sawdust particles, and then mixing the solution and the sawdust until the particles are coated therewith.

HAROLD F. STOSE.